INVENTOR.
LAWRENCE D. NINNEMAN

Dec. 12, 1967  L. D. NINNEMAN  3,357,045
APPARATUS FOR INJECTION BLOW-MOLDING PLASTIC CONTAINERS
Filed Nov. 2, 1964  8 Sheets-Sheet 3

INVENTOR.
LAWRENCE D. NINNEMAN
BY
ATTORNEYS

Dec. 12, 1967 L. D. NINNEMAN 3,357,045
APPARATUS FOR INJECTION BLOW-MOLDING PLASTIC CONTAINERS
Filed Nov. 2, 1964 8 Sheets-Sheet 4

INVENTOR.
LAWRENCE D. NINNEMAN
BY
ATTORNEYS

INVENTOR.
LAWRENCE D. NINNEMAN
ATTORNEYS

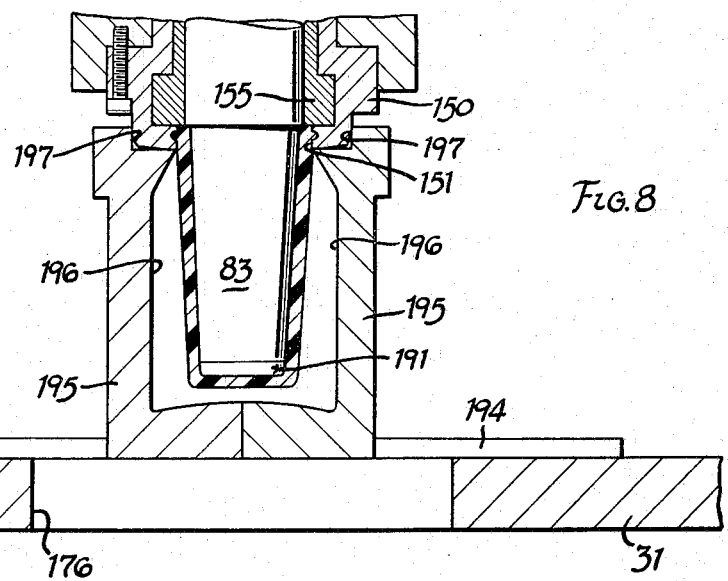
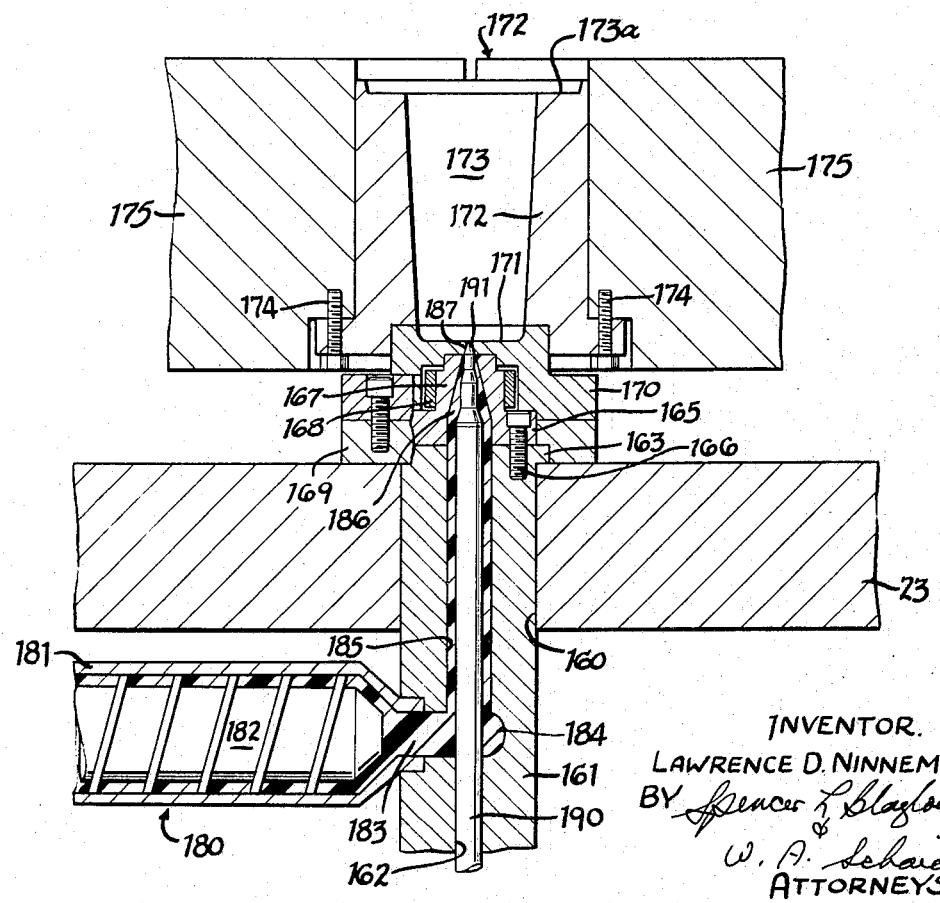
Fig. 8
INVENTOR.
LAWRENCE D. NINNEMAN
BY
ATTORNEYS

Dec. 12, 1967  L. D. NINNEMAN  3,357,045
APPARATUS FOR INJECTION BLOW-MOLDING PLASTIC CONTAINERS
Filed Nov. 2, 1964  8 Sheets-Sheet 7

INVENTOR.
LAWRENCE D. NINNEMAN
BY
ATTORNEYS

INVENTOR.
LAWRENCE D. NINNEMAN
BY
ATTORNEYS

United States Patent Office 3,357,045
Patented Dec. 12, 1967

3,357,045
APPARATUS FOR INJECTION BLOW-MOLDING
PLASTIC CONTAINERS
Lawrence D. Ninneman, Toledo, Ohio, assignor to Owens-Illinois, Inc., a corporation of Ohio
Filed Nov. 2, 1964, Ser. No. 410,343
7 Claims. (Cl. 18—5)

The present invention relates to an apparatus for making plastic articles, such as blown plastic containers, at least a portion of such articles being injection molded and the remainder of the articles being blow molded.

More particularly, the present invention proposes a new and novel apparatus for the manufacture of a plastic article by combined injection molding and blowing technique and utilizing a plurality of successive forming stations which are "overlapped," i.e., at which operations are simultaneously carried out so that a plurality of articles are manufactured by the simultaneous carrying out of successive operations at separate stations.

In United States Letters Patent No. 3,008,192, assigned to the assignee of the present invention, there is disclosed a method of an apparatus for forming plastic articles by an injection, extrusion and blowing process. Due to the nature of the successive operations which are carried out at a plasticized material supply orifice, this process necessarily involves the use of a "single station" operation wherein all of the operations necessary to complete an article, i.e., injection, extrusion, blowing and article removal, are carried out at the same location. Although a plurality of articles may be manufactured at the same time by utilizing a series of aligned orifices, the process is not "overlapped," i.e., the formation of a second article or series of articles cannot be carried out until after a first article or series of articles has been completely manufactured and removed from the machine.

In the method and apparatus as disclosed in application Ser. No. 146,686, filed in the United States Patent Office on Oct. 17, 1961 (now abandoned), and also disclosed in application Ser. No. 346,877, filed Feb. 24, 1964, a somewhat different process is disclosed wherein a blowable shape is injection molded and subsequently blown to a final configuration. This process or method is capable of overlapped operation, but no specific process steps and no apparatus has been disclosed to perform the claimed steps in an overlapped manner.

The apparatus of the present invention is generally similar to those disclosed in the above-identified applications of Thomas R. Santelli, the apparatus, however, being modified to and being particularly adapted for the purpose of complete overlapped operation. Thus, the process of the present invention discloses an apparatus for manufacturing blown plastic containers or the like articles by injection molding an inflatable preform at a fixed first location, transferring the preform to a blow molding location, blow molding the preform, transferring the preform after or during blowing to a remote location, and then injection molding a second preform at the first location for a subsequent blow molding operation.

More specifically, the present invention proposes the utilization of apparatus including an arcuately movable plate supported by a machine frame for displacement relative to a parison mold in which the preform is injection molded. The arcuately displaceable plate is driven for arcuate movement, as by a ring gear and pinion arrangement, to at least two separate positions. At one of these positions, an aperture in the plate is aligned with the parison mold and a pair of blow mold sections are carried by the plate for arcuate displacement therewith. When open, these blow molds straddle the plate aperture to accommodate the vertical passage therebetween of an injection mold having a cavity conforming to the contour of the container finish or other article portion and a blow pin about which the preform is to be injection molded. The injection mold assembly is vertically movable relative to the plate, so that it can be actuated downwardly through the plate aperture into cooperation relation with the fixed parison mold which is carried by the machine frame beneath the oscillatable plate.

At the parison mold, plasticized material is injected into the parison mold and into the injection mold under pressure to form the necessary preform. Preferably, this injection is carried out at a relatively high injection pressure, and it is necessary that the injection mold be fixedly positioned at the parison mold to withstand this pressure. The injection mold is actuated by a fluid pressure actuated cylinder normally movable with the plate relative to the frame, but bottomed against the frame during the injection molding operation to hold the injection mold and parison mold in assembly against the injection pressure.

Following injection of the preform or parison, the injection mold cylinder is actuated to elevate the parison through the plate aperture and into horizontal alignment with the blow molds mounted on the plate. The blow molds then are closed around the parison, and blow air is introduced into the parison to inflate it to the final configuration of the body of the container. After inflation or, alternatively, during inflation, the plate is arcuately displaced to position the blown container (still enclosed within the blow mold) at a cooling and ejection station while a second aperture in the plate is vertically aligned with the same fixed parison mold.

While the one blown container is still enclosed within its blow mold, a second injection mold is lowered by its fluid pressure actuated cylinder through a second plate aperture into abutment with the lower injection mold and the steps of injection molding, stripping and blowing are repeated to form a second article while the first article is still cooling.

Finally, the first article is removed from the blow molds by opening the blow molds and actuating the neck portion of the injection mold to remove the container from both the blow mold and the injection mold, the container falling through the first plate aperture for gravity removal from the apparatus.

Following the ejection of the finish container the plate is arcuately displaced or oscillated to realign the first plate aperture with the parison mold and to move the second, now blown, container to the cooling and ejection station.

Thus, it will be seen that the injection molding of a parison and the initial blowing of the parison to form a second container are carried out during the period that a first container is cooling interiorly of its blow mold, the positions of the first and second containers merely being reversed to accommodate the formation of a third container parison. In this manner, the operations of injection, blowing, cooling and ejection are carried out sequentially, but the operations are carried out simultaneously upon successively formed containers. In this manner, full utilization of the injection molding capabilities of the parison molds can be carried out. It is not necessary to movably mount the entire system for supplying plasticized material to the parison mold, a very simple actuating mechanism may be utilized to merely arcuately displace or oscillate the plate between a plurality of forming stations and a single forming orifice can be utilized to form a plurality of blowable parisons during the time required to chill a blown container to its accurate final configuration.

It is preferred that the parison be blown to shape prior to its transfer to the cooling and ejection station to avoid subjecting the parison to any transient air currents during transfer, to avoid subjecting the injection molded and still hot parison to any inertial loads prior to blowing, and to obtain maximum utility of the 2-station arrangement of the preferred embodiment of the method and apparatus.

It is, therefore, an important object of the present invention to provide a new and improved apparatus for manufacturing blown plastic containers by the utilization of injection molding and blow molding techniques utilized in a most efficient, overlapped arrangement.

It is another important object of this invention to provide an improved apparatus for the manufacture of a blown plastic container when an oscillatable plate supports a plurality of blow molds and an equivalent number of injection molds which are, respectively, displaceable with the plate, the injection molds being vertically movable with respect to the plate to accommodate the injection molding of a blowable preform at a fixed injection molding station disposed generally beneath the plate.

It is a further important object of this invention to provide an improved apparatus for the manufacture of blown plastic articles, such as containers, and including a horizontally disposed plate oscillatable to two separate and distinct positions, the plate being apertured to allow vertical movement relative thereto of an injection mold cooperable with a fixed parison mold and also cooperable with a blow mold carried by the plate, the aperture in the plate also serving as a dispensing opening through which the finished article is removed from the apparatus.

Other objects of the invention will appear in the following description and appended claims, reference being had to the accompanying drawings forming a part of this specification, wherein like reference characters designate corresponding parts in the several views.

On the drawings:

FIGURE 2 being greatly enlarged in scale;

FIGURE 8 is an enlarged sectional view taken along the plane 8—8 of FIGURE 6 with the machine illustrated in an operating position different from that of FIGURE 6;

As shown on the drawings:

General assembly

Figure 1:
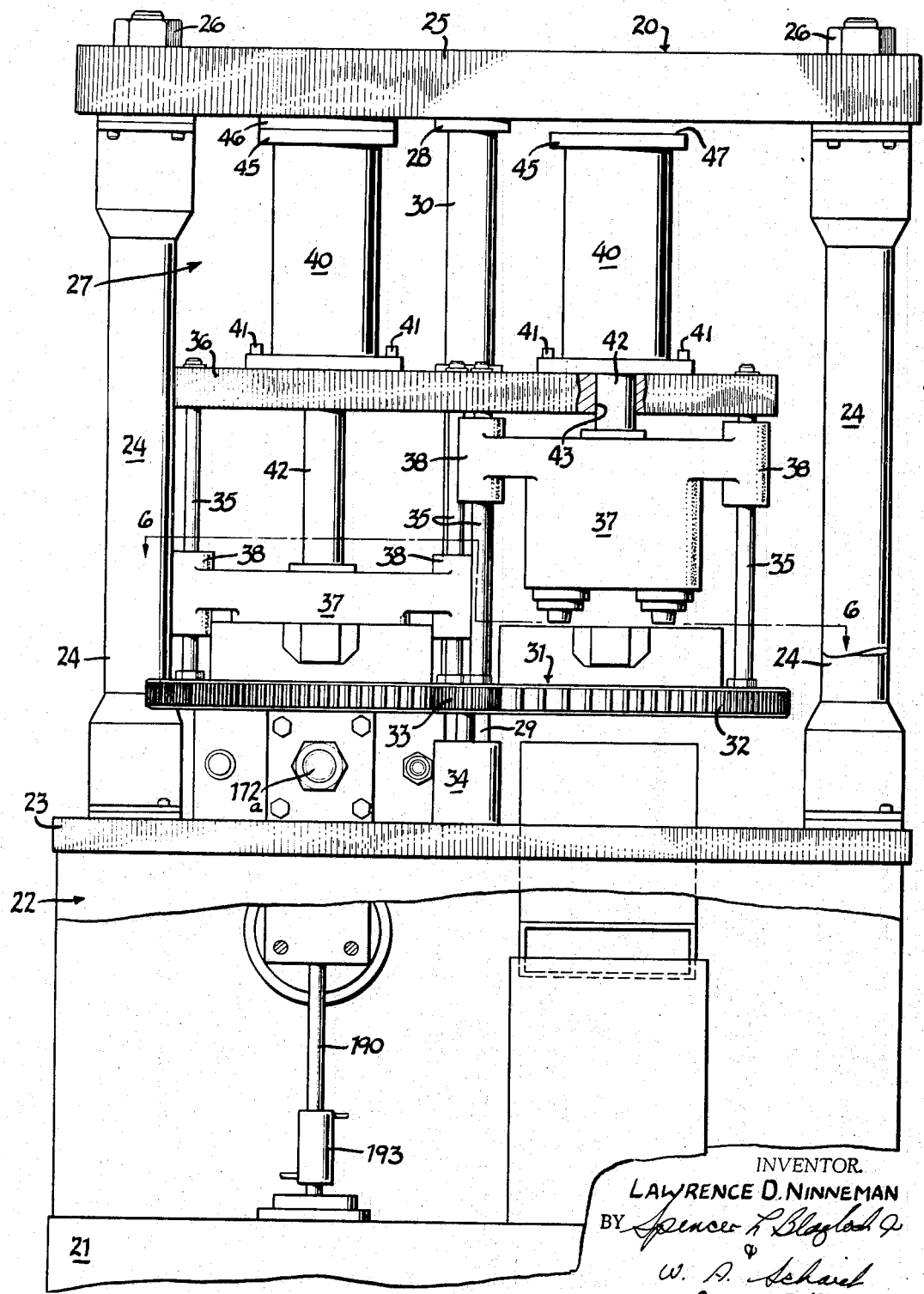
FIGURE 1 is a side elevational view, with parts broken away, of the apparatus of the present invention capable of carrying out the method of the present invention.

In FIGURE 1, reference numeral 20 indicates generally an apparatus of the present invention comprising a base 21 and including a lower enclosed portion 22 surmounted by a base plate 23 from which three vertical stanchions 24 project upwardly to carry an upper or top plate 25 joining the free upper ends of the post 24 and secured thereto by suitable means, as by nuts 26.

Since the top plate 25 and the base plate 23 are spaced vertically, there is provided an interior vertical space indicated generally at 27 therebetween, and this space is traversed by a vertically extending, centrally located shaft 30 journaled for free rotation in an upper bearing 28 located centrally on the top plate 25 and a lower bearing 29 located centrally on and surmounting the base plate 23. Any suitable bearing means 28, 29 may be utilized, although preferably a plain bearing 28 is utilized and a pair of tapered, roller-type, axial thrust bearings are utilized to from the bearing 29.

Secured to the freely rotatable shaft 30 is a radially extending, arcuately actuatable table, indicated generally at 31, and circumscribed by a ring gear 32. The table 31 and the ring gear 32 are spaced vertically above and extend parallel to the base plate 23. This ring gear 32 meshes with a pair of pinions 33 rotationally driven by suitable means, as by hydraulic motors 34. Obviously, rotation of the pinion 33 by means of the motors 34 will cause the table 31 to rotate in the space 27 by engagement of the pinions 33 with the ring gear 32.

Carried by the table 31 are a plurality of vertically upstanding posts 35 which serve to guide the vertical displacement of a pair of neck ring crossheads 37 which are identical in construction and configuration.

The crosshead structure

As best shown in FIGURES 2 through 5, the crossheads 37 are each provided with laterally spaced, vertically projecting sleeves 38 integral with the crossheads and serving to guide the crossheads for vertical displacement on the rods 35.

The crossheads are actuated vertically for independent movement relative to one another and relative to the table 31 by means of fluid pressure actuated cylinders 40 (FIGURE 1) which are carried by the upper surface of the top plate element 36 (being mounted thereon by bolts 41) to project freely vertically thereabove. The piston rods 42 of the cylinders 40 project vertically downwardly through apertures 43 in the plate 36 for attachment, as through attaching blocks 44, to the crossheads 37, respectively.

It will be noted from FIGURE 1 that the upper ends of the cylinders 40 each terminate in an abutment block 45, and that the under surface of the top plate 25 carries a corresponding abutment block 46, these abutment blocks 46 being located at specific rotatable locations of the table 31. Further, it will be noted that the upper surface of each of the abuments 45 carried by the cylinders 40 are spaced from the corresponding abutment block 46 through a slight distance, indicated at 47 in FIGURE 1, this distance being on the order of a few thousandths of an inch. Upon actuation of either of the cylinders 40 to extend the piston rods 42 thereon downwardly, as will be hereinafter explained, the crosshead 37 is actuated downwardly against a fixed abutment. When this abutment in encountered, the compression force in the piston rods 42 tends to displace the corresponding cylinder 40 vertically upwardly. The upper plate 36 of the rotatable carriage is of relatively light construction, in order to reduce the overall arcuate momentum of the carriage assembly, and this plate 36 can deflect vertically upwardly through at least the dimension 47, so that the abutment blocks 45 of the one cylinder abuts the aligned block 46 carried by the top plate 25. Thus, the clamping load imposed on the corresponding piston rod 42 is transferred to the massive fixed top frame element 25 and the massive stanchions 24, and this clamping load need not be borne by the rotatable carriage.

Turning now to the structure of the crossheads 37, these crossheads are identical and therefore the disclosure of one such head is sufficient.

Figure 2:
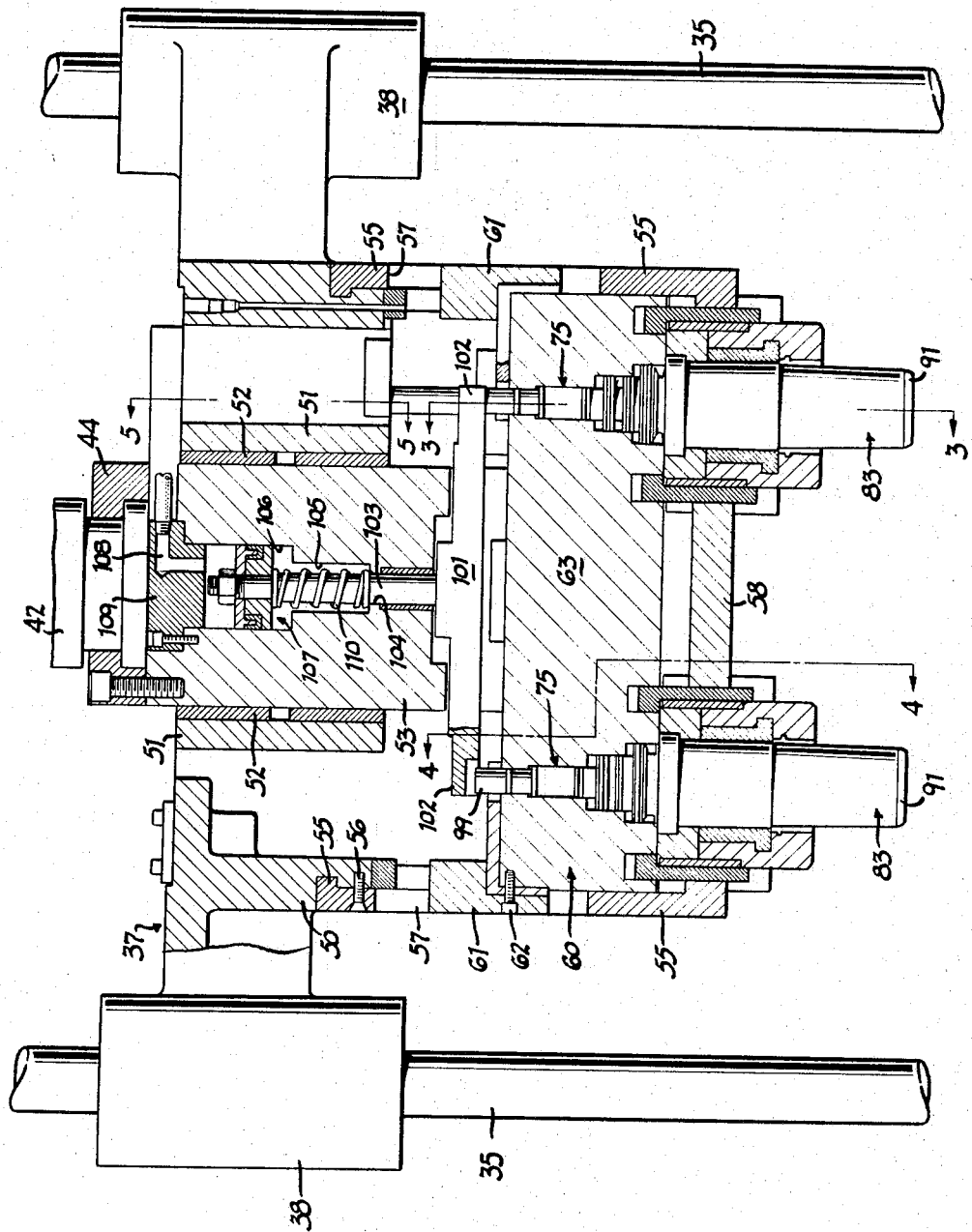
FIGURE 2 is a vertical sectional view through one of the forming heads of the apparatus of FIGURE 1.

Referring now to FIGURE 2 of the drawings, it will be seen that the crosshead 37 is guided by the integral sleeves 38 for vertical displacement upon the guide rods 35 upon actuation of the corresponding crosshead cylinders 40. The crosshead proper includes a main casting 50 formed integrally with the sleeves 38, this casting 50 being generally rectangular in exterior configuration and including an inner generally cylindrical wall 51 receiving at its inner periphery a bearing spacer 52. Peripherally surrounded by the spacer 52 is a central, vertically extending block 53 which is surmounted by the mounting block 44 secured to the crosshead cylinder piston rod 42. The casting 50 and the central block 53 are relatively vertically displaceable.

Carried by the exterior of the casting 50 are a pair of side plates 55 which are secured to the casting by suitable means, as by screws 56, these side plates being apertured, as at 57, for a purpose to be hereinafter more fully described. These side plates 55 are joined by a transversely extending lower support element 58.

Journaled in the casting 50 for vertical movement relative thereto and jointly movable with the block 53 is a crosshead insert block, indicated generally at 60. This insert block 60 includes a pair of stop blocks 61 projecting into the apertures 57 in side plates 55 and vertically movable relative thereto, the block 60 thus being guided by the edges of the apertures 57 and by a guide pin and bushing arrangement (not shown), for vertical displacement only relative to the casting 50. The blocks 61 (which limit movement of the neck rings, hereinafter described) are secured by suitable means, as by screws 62, to a central block 63, this block 63 being secured at its upper extremity to a mounting plate 64 (FIGURE 3) entrapping the enlarged end 65 with an actuating cylinder rod 66.

Figure 5:
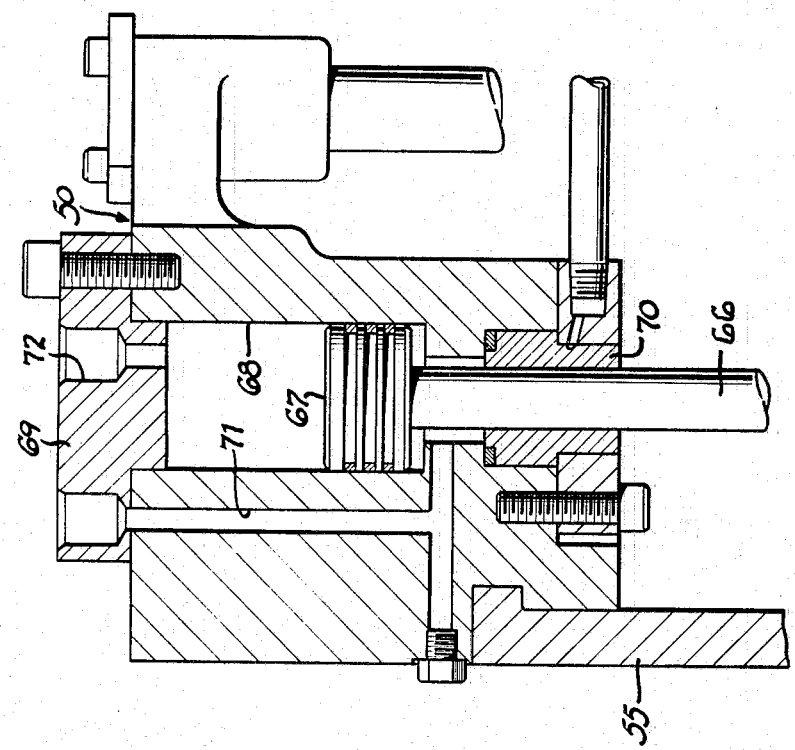
FIGURE 5 is a fragmentary sectional view taken along the plane of 5—5 of FIGURE 2.

The cylinder rod 66 projects vertically upwardly to terminate in a fluid displaceable piston 67 vertically movable in a fluid pressure cylinder space 68 formed in the neck mold casting 50, and best illustrated in FIGURE 5 of the drawings. The casting 50 surrounds the sides and bottoms of the space 68 and an upper cap 69 is secured to the casting 50 to close the upper extremity of this space 68. A lower guide bushing 70 guides the rod 66 for vertical displacement relative to the casting, while a passage 71 for pressurized fluid communicates with the space 68 beneath the piston 69, and a second passage 72 is provided for the access of pressurized fluid to space 68 above the piston 67.

Thus it will be appreciated that relative displacement of the casting 50 and the piston 67 (in a manner hereafter more fully set forth) would affect movement of the block 60 relative to the crosshead 37.

Figure 3:
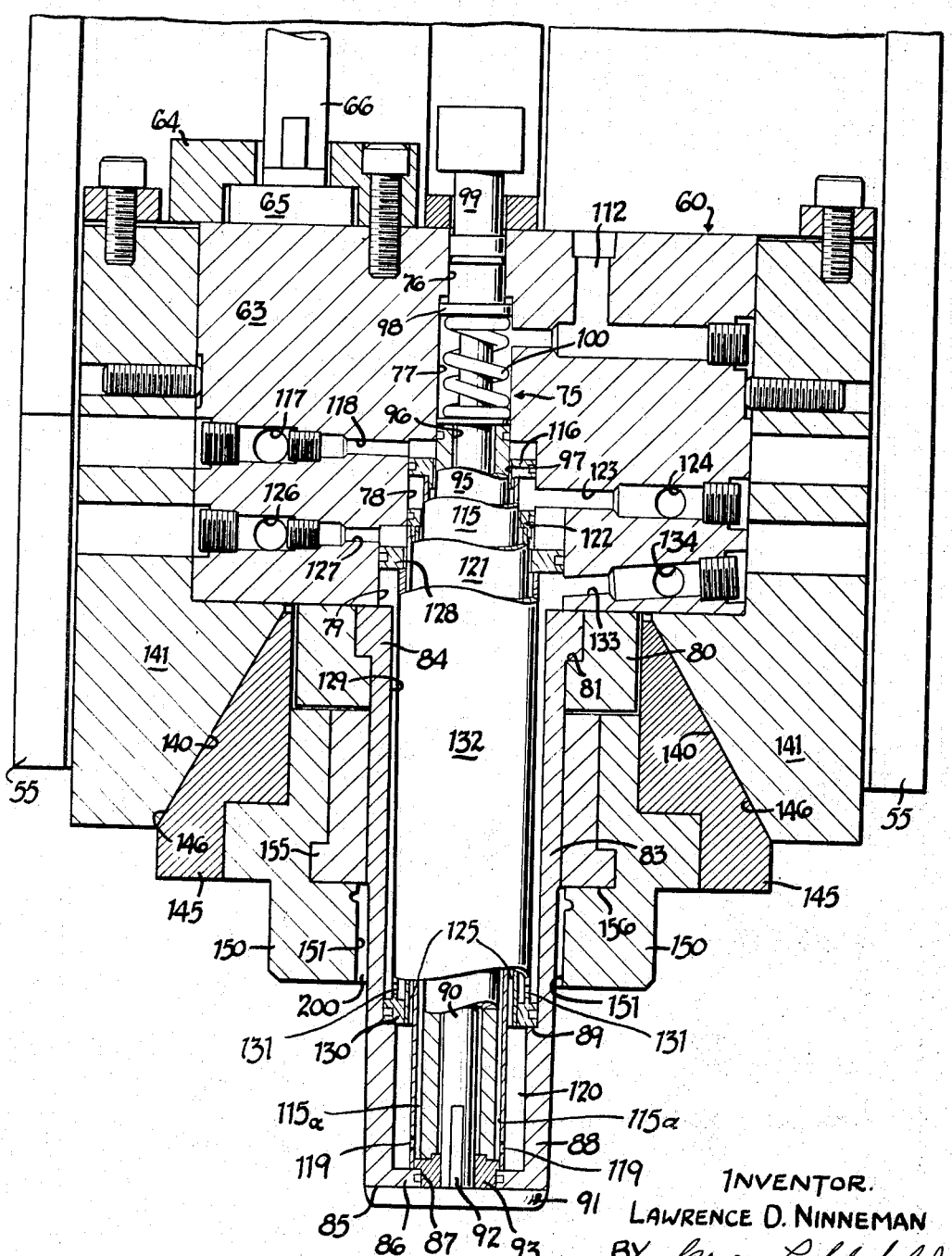
FIGURE 3 is an enlarged vertical sectional view taken along the plane 3—3 of FIGURE 2.

As best illustrated in FIGURES 2 and 3 of the drawings, the block 60 is provided with a pair of laterally spaced, vertically stepped bores 75 therethrough.

As shown in FIGURE 3 of the drawings, this bore includes an upper, relatively small bore 76, a somewhat larger intermediate bore 77, substantially enlarged intermediate bore 78 and an even larger bore recess 79 opening onto the bottom face of the block 60. Secured to the under surface of the block 60 is a mounting ring 80 having an upwardly facing, radially enlarged flange face 81, this mounting ring 80 serving to secure to the block for displacement therewith an injection mold core sleeve indicated generally at 83.

*Injection mold core sleeve structure*

This sleeve 83 has an upper radially enlarged flange 84 seated upon the surface 81 of the ring 80. Injection mold core sleeve 83 is generally cylindrical in exterior contour and depends from the block 60 in alignment with the bore 75 thereof. One such sleeve 83 is provided for each such bore 75, sleeves terminating at lower extremities 85 in an in-turned terminal flange 86 surrounding a central axial opening 87. The interior of the sleeve 83 is substantially cylindrical, the upper portion 88 thereof terminating in an in-turned seat 89 spaced above the in-turned terminal flange 86.

Projecting axially of the sleeve 83 is an axial actuating rod 90 terminating at its lower end in a radially enlarged valve head 91 snugly abutting the lower terminal surface 85 of the sleeve 83, the stem 90 being generally cylindrical in exterior contour and having one or more flat surfaces 92 formed thereon. The stem 90 is vertically actuatable and is guided for such vertical or axial movement by means of a bushing 93 snugly confined by and secured to the in-turned flange 86 at the bottom of the sleeve 83.

The stem 90 is surrounded by a cylindrical air tube 95 which projects vertically beyond the confines of the sleeve 83 and which terminates interiorly of the block 60 intermediate the height thereof. Further, this tube 95 is provided with an interior bore 96 which is spaced peripherally from the exterior of the stem 90 to define an air space 97 therebetween.

The stem 90 projects vertically beyond the confines of the tube 95 and is provided at its upper end with a radially enlarged flange 98 from which an upper actuating extension 99 projects upwardly beyond the confines of the block 60 for a purpose to be hereafter more fully described. A compression spring 100 is bottomed against the upper extremity of the air tube 95 and acts upon the under surface of the enlarged flange 96 of the stem 90 to urge this stem upwardly relative to the block 60 and relative to the sleeve 83. The spring 100 thus urges the radially enlarged valve flange 91 secured to the stem 90 against the undersurface 85 of the sleeve 83 in sealing contact therewith.

The stem 90 can be actuated downwardly against the bias of the spring 100 by means of a transverse air-control arm 101 interposed between the casting insert 53 and the block 60 (FIGURE 2). This air-control arm 101 has laterally projecting extremities 102 overlying the stem extension 99, and a central vertically projecting piston rod 103 extends centrally of the casting insert 53 through a bore 104 therein to communicate with a first, relatively small recess 105. A second relatively larger recess 106 defines a fluid pressure cylinder space internally of the insert 53 and surrounding an actuating piston 107 which is secured to the free end of the piston rod 103. The cylinder-piston assembly 106, 107 is single acting, and is supplied with fluid under pressure from a passage 108 formed in a cylinder closure plate 109. A compression spring 110 is bottomed in the recess 105 and acts on the undersurface of the piston 107 to normally urge the piston to its position illustrated in FIGURE 2 of the drawings, wherein the control arm 101 is in its elevated position and at which the valve element 91 closes the lower open end 85 of the sleeve 83.

Obviously, upon the introduction of fluid under pressure through the passage 108 into the recess 106, the piston 107 will be actuated downwardly against the bias of the spring 110, thereby lowering the control arm 101 and contacting the stem extension 99 to displace the stem 90 vertically downwardly to space the valve closure plate 91 from the end face 85 of the sleeve 83. This motion of the stem is necessary in order to introduce air through the air passage 97 surrounding the stem 90, such air being supplied from an air passage 112 communicating with the intermediate bore 77 in the block 60.

Air in the bore 77 flows downwardly through the annular passage 97, i.e. between the stem 90 and the bushing 93, to flow radially outwardly between the valve plate 91 and the lower surface 85 of the sleeve 83. The flat surfaces 92 on the cylindrical stem 90 are provided to accommodate this flow of air through the guide bushing 93.

Surrounding the air tube 95 is a tubular sleeve 115 provided with an enlarged head 116 located within the bore portion 78. Hot water under pressure from passage 117 in the block 60 flows through a transverse passage 118 into the bore portion 78 and hence flows intermediate the tube 95 and the sleeve 115 downwardly against the bushing 93 through the annular passage 115a. A pair of lateral outlet ports 119 accommodates the flow of such warm water radially outwardly into the space 120 internally of the lower end of the sleeve 83 from whence the hot water flows upwardly interiorly of the tube 121 into the bore portion 78 beneath the tube head 116 and above a second tube seal head 122 to exit through a transverse outlet opening 123 and a block outlet 124 by flow through annular passage 125. Thus, hot water can be circulated through the passages 117, 118 through the sleeve 115, downwardly through the passage 115a, then outwardly through ports 119 into the chamber 120 and upwardly through passage 125 to exit through the outlet passages 123 and 124, thereby maintaining the sleeve 83 at a desired temperature.

Similarly, cold water is introduced through a block passage 126 and a transverse passage 127 into the block bottom recess 79 above a partition 128 for flow interiorly of a sleeve 129, downwardly against a lower radial partition 130 seated on the interior sleeve shoulder 89. This cold water exits transversely through ports 131 and upwardly through annular passage 132 defined intermediate the sleeve 121, and the injection mold sleeve 84, to exit through a lateral passage 133 and a transverse passage 134 formed in the block 60. Thus, it is possible to circulate cold water from the passage 126 through the transverse passage 127, downwardly through the sleeve 129, to the blocking element 130 and laterally through the ports 131 to exit through the annular passage 132, and finally through the passages 133, 134, thereby cooling an upper portion of the sleeve 83 in a manner to be hereafter more fully described.

Neck mold structure

Figure 4:
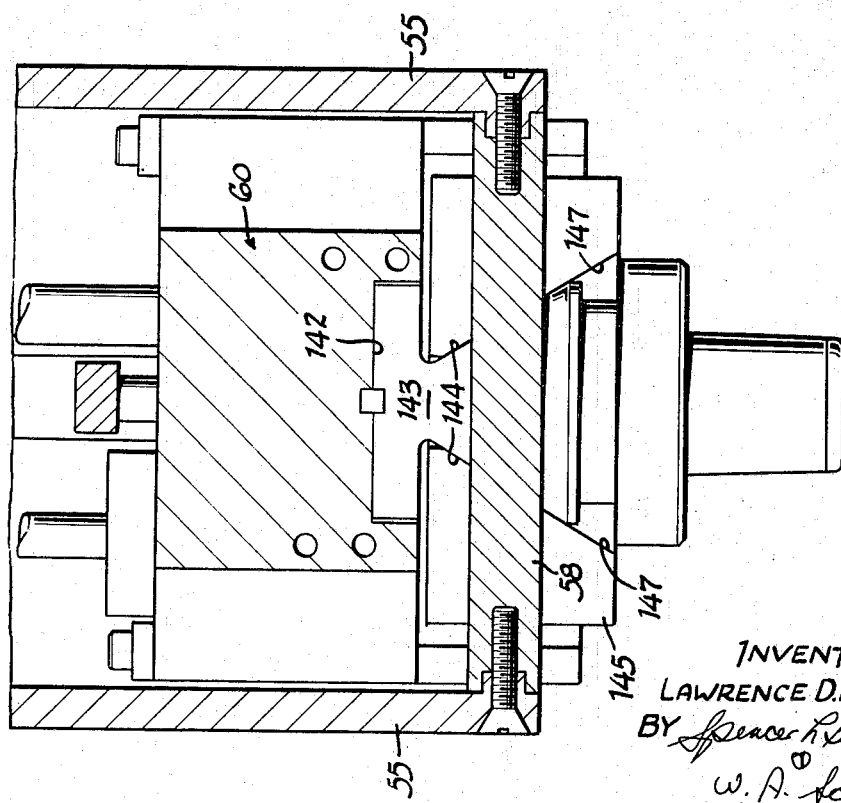
FIGURE 4 is an enlarged fragmentary sectional view taken along the plane of 4—4 of FIGURE 2.

As illustrated in FIGURE 3 of the drawings, the block 60 is co-movable with a pair of upwardly and inwardly inclined cam surfaces 140, these cam surfaces being provided at the inner surfaces of cam blocks 141. As seen in FIGURE 4 of the drawings, the block 60 is provided at its lower lateral extremities with a pair of spaced bottom recesses 142 in which are disposed cam elements 143 secured to the block for co-movement therewith and having downwardly and outwardly inclined camming surfaces 144.

Carried by the side plates 55 and particularly by the transversely extending support 58 are (FIGURE 4) a pair of cam blocks 145, these blocks being guided for transverse movement by the support 58. The cam blocks 145 have first camming faces 146 engageable with cam surfaces 140 (FIGURE 3) of the blocks 141 and have second camming faces 147 engageable with the camming faces 144 of the blocks 143 (FIGURE 4). It will be noted that the cam elements 145 are movable only transversely relative to the casting 50, while the cam blocks 141 and 143 are movable vertically with the head 60.

Secured to the cam elements 145 for movement therewith are a pair of neckmold or finish mold sections 150 which have semicylindrical interior faces 151 positioned adjacent, but in radially spaced relation to, the exterior surface of the sleeve 83. These neckmold sections 150 are transversely movable (as viewed in FIGURE 3) relative to the sleeve 83 and also relative to a neckmold ring 155 which has a lower surface 156 guiding the neckmold sections 150 for transverse movement.

As illustrated in FIGURE 2 of the drawings, the crosshead actuating rod 42 of the cylinders 40 will be held in place by the large cylinders 40, thereby fixing the position of the central block 53. Upon actuation of the piston-cylinder combination 67, 68 by the introduction of fluid under pressure, i.e. through the line 71, the block 60 will be held in position by the cylinder 40 and the piston rod 66 cannot move; therefore, the casting in which the cylinder 68 is formed will move downwardly over the piston 68. This motion of the block 60 will carry the side plates 55 and the cam elements 145 downwardly relative to the block 60. By so moving the cam blocks 145 downwardly over the cam element 143, the element 143 spreads the cam elements 145 laterally outwardly, these elements 145 carrying the neckmold sections 150 to transversely separate the neckmolds from any material interposed between the neckmold and the sleeve 83. As this movement continues, the undersurface of the neck ring bushing 155 will contact the upper surface of any such material, and will push the finished article from the sleeve 83 in a manner to be hereafter more fully described.

The plasticized material supply mechanism

As best illustrated in FIGURE 8 of the drawings, and also referring to FIGURE 1 of the drawings, the base plate 23 of the machine is provided with vertical apertures 160 through which project vertical, tubular supply conduits 161, these conduits having central bores 162 therethrough and being provided with upper peripheral flanges 163 overlying the plate bores 160. The conduits 161 are each surmounted by an orifice block 165 secured, as by bolts 166, to the conduit and having a central, upwardly projecting center pilot 167 surrounded by a resistance-type electrical heater 168. Securing the orifice block 165 peripherally is a mounting ring 169 and superimposed on the mounting ring is a parison bottom plate 170 having its upper surface downwardly dished, as at 171, to define the bottom of the parison which is formed by injection molding, as hereinafter more fully described.

Figure 6:
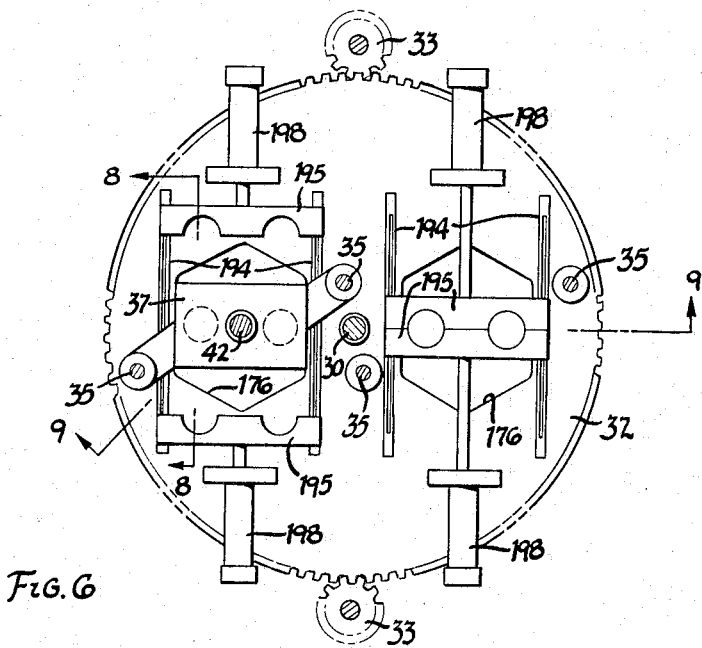
FIGURE 6 is a reduced scale, somewhat schematic plan view of the machine of the present invention taken along the plane 6—6 of FIGURE 1 and illustrating the machine in a first oscillated position.

A sectional parison mold is provided, each of the parison mold section 172 being provided with a semicylindrical, somewhat downwardly tapered interior recess 173 registering with the recess 171 in the upper surface of the parison bottom block 170. The parison mold sections 172 are secured, as by bolts 174, in parison holders 175, which are mounted generally beneath the rotatable table 31, and in axial alignment with the table apertures 176 which are also illustrated in FIGURE 6.

The parison mold sections 172 can be opened by relative separation, if desired, such separation being accomplished by fluid actuated cylinders 172a (FIGURE 1). Thus, a reversely tapered parison can be formed in the partible parison mold.

A plasticizer-extruder, indicated generally at 180, is provided, this plasticizer-extruder including a generally cylindrical exterior barrel 181 enclosing an axially reciprocable plasticizing screw 182. The interior of the barrel 181 communicates at its forward end, as at 183, with a cross-flow passage 184 interconnecting a pair of plasticized material conduits 161, each of these conduits being provided with an enlarged recess 185 concentric with the bore 162 to provide vertical passage for plasticized material. Each of the orifice blocks 167 is provided with a channel 186 communicating with the recess 185 and which tapers upwardly and inwardly toward a restricted tapered orifice 187 in the parison bottom plate 170. Positioned in the bore 162 and projecting axially through the passage 185 is an elongated valve rod 190 which is stepped-down at its upper extremity to terminate in a frusto-conical valving tip 191 which cooperates in valving relation with the aperture 187.

This valve rod 190 projects downwardly beyond the conduit 161, as illustrated in FIGURE 1 of the drawings, for connection to the piston (not shown) of a hydraulic piston cylinder assembly 193 capable of actuating the valve rod 190 downwardly from its illustrated position of FIGURE 8 to interconnect the passage 186 and the parison mold space 173.

Figure 7:
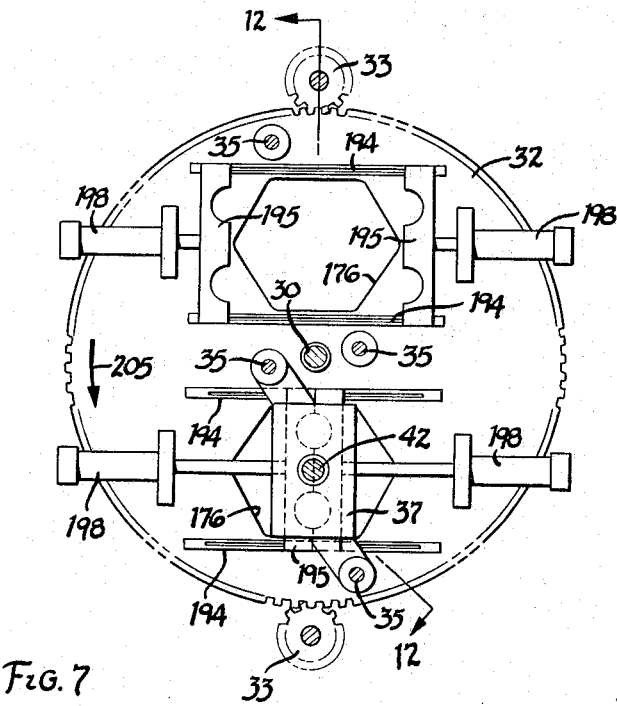
FIGURE 7 is a view similar to FIGURE 6 but with the machine oscillated 90 degrees during its travel from one operating position to a second operating position.
Figure 9:
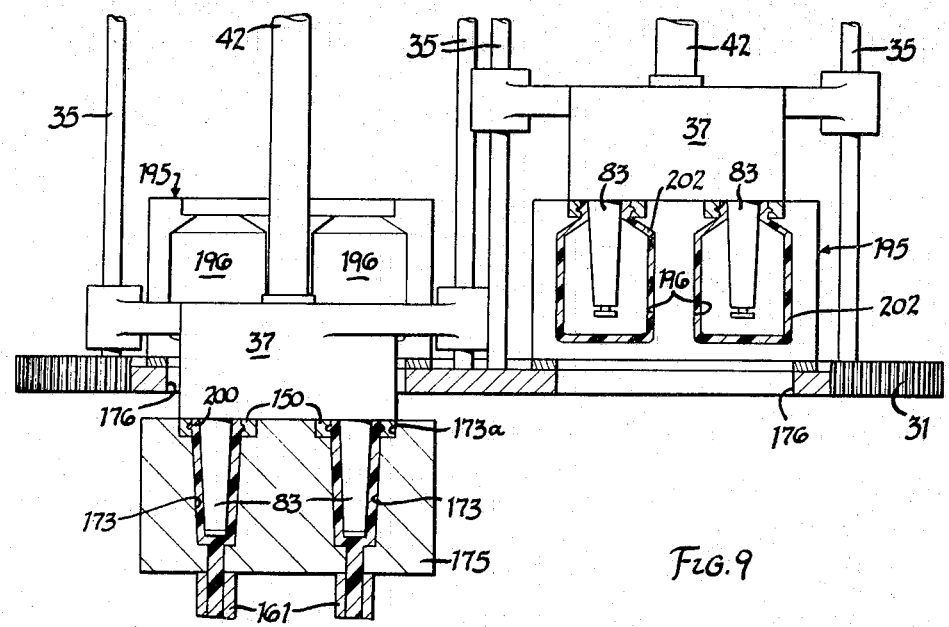
FIGURE 9 is a schematic sectional view taken along the plane 9—9 of FIGURE 6.

As best shown in FIGURES 6, 7 and 8, the rotatable plate 31 carries with its upper surface two pairs of spaced guide rails 194 which serve to guide blow mold sections 195 for transverse displacement relative to the plate 31. As shown in FIGURES 6, 8 and 9, each such blow mold section 195 has at its radially inwardly directed face a blow mold recess 196. These blow mold recesses are open-topped and each is generally semicylindrical so that when the two blow mold sections 195 are moved into abutment with one another (FIGURES 7 and 8) the recesses 196 cooperatively define an interior, open-topped blow mold cavity conforming to the shape of the body or blown portion of a container being manufactured. The upper edges of the blow mold sections 196 are recessed, as at 197, in alignment with the recesses 196 to receive therein the neck mold sections 150 which have been heretofore described.

*Operation of the apparatus of the present invention*

The operation of the apparatus of the present invention will be apparent from a study of FIGURES 6, 7 and 9 through 12, inclusive.

It will be remembered from FIGURE 1 that the device of the present invention is provided with a pair of crossheads 37 from which depend the pair of parison mold sleeves or blow pins 83, each such sleeve being surrounded by a neck mold 150.

As illustrated in FIGURES 1, 6 and 9, and assuming that the apparatus has been operating in a recurrent cycle, it will be seen that one such crosshead 37 is lowered to insert the parison sleeves 83 thereof into the parison mold recesses 173 of the lower parison mold block or holder 175. This one crosshead 37 is lowered by the corresponding cylinder 40 and cylinder rod 42, so that the crosshead projects through the aperture 176 in the rotatable plate 31, the blow mold sections 195 being retracted by their actuating cylinders 198 to accommodate such downward displacement therebetween (FIGURE 6). Additionally, it will be noted that the parison mold recess 173 has an upper, relatively shallow recess 173a into which the neck mold sections 150 depend in firmly sealed and bottomed relation under the pressure of the force of the cylinder 40 exerted on the cylinder rod 42.

When the crosshead 37 is thus positioned, the plasticizer-extruder screw 180 is advanced to the right (FIGURE 8), and the valve 190 is retracted downwardly by the cylinder 193, so that a charge of plasticized material passes through the passage 185 of the conduit 161 and through the tapered passage 186 and the orifice 191 into the parison mold space which is provided interiorly of the parison mold cavity 173 and about the sleeves 83. This charge also fills the neck mold space 200 defined between the neck mold sections 150 and the sleeve 83 (FIGURE 3).

Of course, in the schematic FIGURES 9 through 12, inclusive, some of the details of construction, such as the valve rod 190, the orifice block 167 and the parison bottom block 170 have been deleted for clarity of illustration.

In any event, following the filling of the parison mold space, a complete parison has been formed about the core pin sleeves 83, this parison including the integrally formed and injection molded neck.

After the mold space has been filled, the valve rod 190 (FIGURE 8) is actuated upwardly to its position illustrated in FIGURE 8 to close off communication between the parison mold recess 173 and the plasticized material passages 185, 186. Subsequent to this closure of the valve head 191, the plasticizer-extruder screw 182 is actuated to the left, either by means of internal pressure or by means of an external power source, to accumulate the next successive storage of plasticized material.

Following the completion of the injection molding operation, the head 37 dwells for a relatively short, predetermined time in its lowered position of FIGURE 9, until such time as the plasticized material has set to a substantially self-sustaining state when supported upon the core pins 83. Next, the lowered head 37 is elevated by means of the cylinder 40 and the cylinder rod 42 to strip the injection molded parison from the parison molds 172. The parison mold sections 172 are preferably laterally separable to aid in such stripping motion, if desired. The parison mold sections are actuated to and from this separated position by suitable fluid actuated cylinders (not shown).

Alternatively, the parison mold sections may remain closed or may even be made in one piece, if such separation is neither desirable nor necessary for proper stripping.

Figure 10:
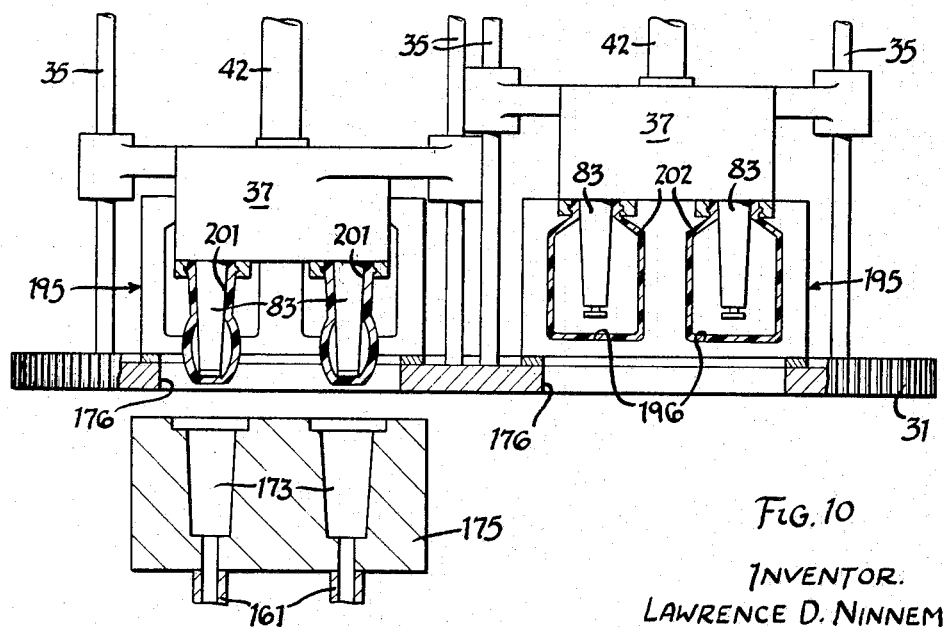
FIGURE 10 is a view similar to FIGURE 9, illustrating a subsequent step in the method.

This elevation of the lowered crosshead 37 is illustrated in FIGURE 10 of the drawings, the injection molded parisons being moved upwardly through the plate apertures 176. Preferably, during this raising operation and after stripping of the injection molded parison 201 from the parison mold recesses 173, the radially enlarged valve head 91 is actuated downwardly by its stem 90 to accommodate the entry of air from the air passage 77 into the interior of the parison. Initially, a small volume of such air is introduced to "puff" or partially inflate the parison. It will be recalled from FIGURES 2 and 3 that the valve stem 90 is actuated downwardly upon the introduction of air through the passage 108 into the cylinder 106 to depress the piston 107 therein against the compression of the spring 110, the air control arm 101 being depressed so that its extremities 102 depress the stem 90 against the compression of the spring 96.

Figure 11:
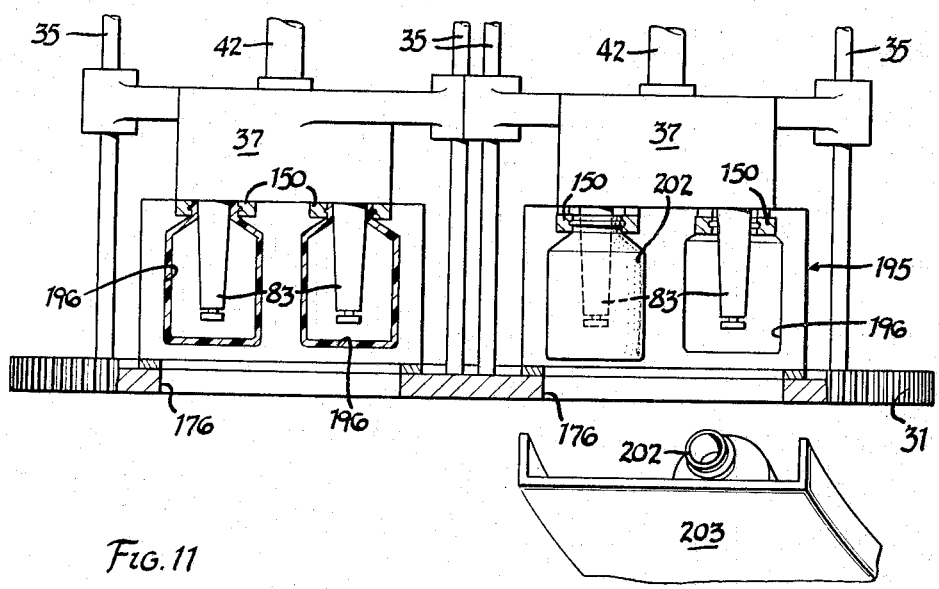
FIGURE 11 is a view similar to FIGURES 9 and 10, illustrating yet another step in the method.
Figure 12:
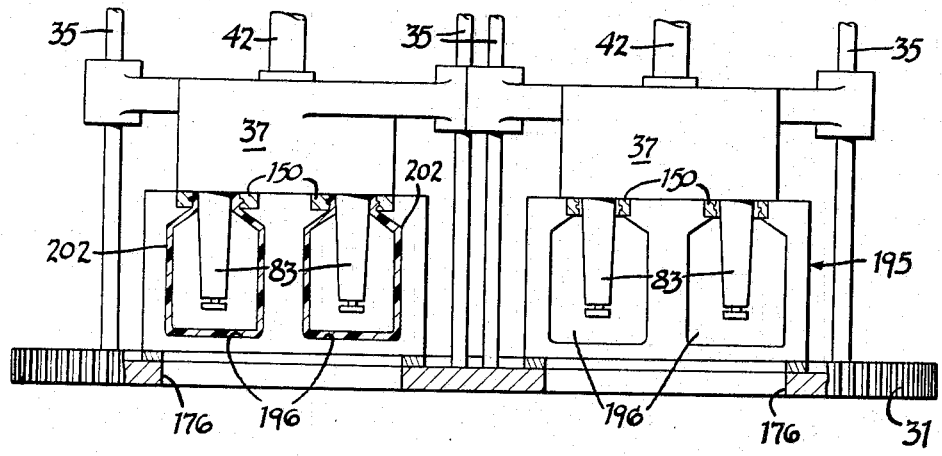
FIGURE 12 is a view similar to FIGURE 9 but taken along the plane 12—12 of FIGURE 7.

When the parions 201 have been elevated to a sufficient extent, the blow mold sections 195 are closed to the position illustrated in FIGURE 8, and also FIGURE 11, such movement of the blow mold sections being guided by the guides 194. Once again it will be seen that the neck mold sections 150 remain closed by the cams 141 and that the recesses 197 in the blow mold sections close about these neck mold sections to center the neck mold sections 150 relative to the blow mold sections 195.

Next, blow-air under high pressure, on the order of 100 pounds per square inch, is introduced through the air passage 112 and the vertical passage 100, and about the stem 90 for flow through the passage provided by the valve head 91 spaced from the lower end 85 of the sleeve 83, thereby inflating the parison interiorly of the blow mold to the final configuration of the blown container.

During all of the foregoing operation we have been dealing only with the lefthand head 37. During the formation of the parison by injection molding, during the vertical upward retraction of this lefthand head 37, and during the blowing of the parisons 201 to their final configuration, the righthand crosshead 37 has been positioned in its illustrated upper position over the plate 31 and in registry with the plate opening 76. After a sufficient length of time has elapsed since the initial blowing of the final containers 202 in the righthand head 37, the blow molds are opened by means of the blow mold cylinder 198 and the neck mold sections 150 are opened by the procedure heretofore described, i.e., utilizing the downward movement of the cylinder 68 over the piston 67 to lower the casting 63 interiorly of the head 37, thereby moving the cam blocks 145 downwardly and outwardly over the fixed cam element 143. This action is illustrated in FIGURE 11 of the drawings, wherein it will be seen that such motion of the neck molds both opens the neck molds and pushes the finished container 202 downwardly off the pins 83 and into a lower delivery chute 203.

After the ejection of the finished containers 202, the table 31 is rotated or oscillated 180 degrees from its position of FIGURE 6 so that the formely lowered, lefthand head 37 occupies the position of the righthand head 37, as heretofore described, and the righthand head 37 is positioned in vertical alignment with the parison mold recesses 173.

FIGURE 7 of the drawings illustrates this motion and shows the head moved 90 degrees from its position of FIGURE 6. Of course, the table 31 continues its motion in the clockwise direction, as illustrated by directional arrow 205, until the position of FIGURE 6 is attained with the heads 37 being in the reverse order.

Once the head has been moved through its 180 degree arc the operations above-described are resumed to injection mold the parison, puff the parison, and inflate the parison internally of the blow molds at the lefthand head. The next successive operation will take place in a counter-clockwise direction so that the plate 31 and the head assemblies, blow mold assemblies and all of the remainder of the apparatus mounted thereon, oscillates between two positions which are arcuately spaced through an angle of 180 degrees.

The terms horizontal, vertical, and the like utilized in the foregoing specification and claims appended hereto are for purposes of description and relative positioning only and are not intended as limitatoins upon the orientation of the device of the present invention in actual use.

It is to be understod that the invention is not limited in its application to the details of construction and arrangement of parts illustrated in the accompanying drawings, since the invention is capable of other embodiments and of being practiced or carried out in various ways. Therefore, the foregoing description is to be considered exemplary rather than limiting, and the true scope of the invention is that defined in the following claims.

I claim:

1. In an apparatus for making a plastic container having an injection molded neck and a blow molded body,
    a vertically fixed, horizontally oscillatable plate;
    means for oscillating said plate to a plurality of arcuately adjusted positions;
    said plate having a plurality of apertures therethrough;
    a plurality of injection molds carried by said plate for oscillation therewith and vertically aligned with said apertures, respectively;
    means for vertically displacing said injection molds relative to said plate;
    a single parison mold located beneath the plate in a fixed position and registering with successive apertures as said plate is moved to each of its said adjusted positions, respectively.
    each of said injection molds being displaceable through its aligned aperture and into abutment with said parison mold, respectively when said aligned aperture registers with said parison mold,
    blow mold sections mounted on said plate for oscillation therewith;
    said blow mold sections being horizontally actuatable relative to said plate to a closed position overlying said apertures and to open positions straddling and apertures, respectively, and
    means for actuating said blow mold sections.

2. In an apparatus for making plastic containers having injection molded finish portions and blow molded body portions, respectively,
    means defining separate and distinct injection molding and article removal stations, said stations being spaced horizontally and lying in vertically spaced horizontal planes, respectively,
    an oscillatable plate lying in a horizontal plane interposed vertically between the planes of said injection molding and said article removal stations, said plate being of a horizontal extent sufficient to span the distance between said stations,
    means supporting said plate for arcuate movement of its said horizontal plane,
    an injection mold movable arcuately with said plate and actuatable vertically relative to said plate for positioning in the planes of said stations, respectively,
    a blow mold movable arcuately with said plate and lying in the horizontal plane of said article removal station,
    actuating means for said injection mold, and
    means for oscilalting said plate.

3. In an apparatus for making a plastic container having an injection molded neck and a blow molded body,
    a vertically fixed, horizontally oscillatable plate;
    means for oscillating said plate to each of several arcuately adjusted positions,
    said plate having an aperture therethrough,
    an injection mold carried by said plate for oscillation therewith and vertically aligned with said aperture;
    a parison mold located beneath the plate in a fixed position and registering with said aperture as said plate is moved to one of its said adjusted positions,
    blow mold sections mounted on the upper surface of said plate for oscillation therewith;
    said blow mold sections being horizontally actuatable relative to said plate to a closed position overlying said aperture and to an open position straddling said aperture,
    means for actuating said blow mold sections,
    and means vertically displacing said injection mold relative to said plate (1) to depend intermediate the blow mold sections when in the open position and through said aperture into cooperative relation with the parison mold and (2) to overlie said plate in spaced relation thereto in cooperative relation with the blow mold sections when in the closed position.

4. In an apparatus for making plastic containers having injection molded finish portions and blow molded body portions respectively,
    means defining separate and distinct injection molding and article removal stations, said stations being spaced both vertically and horizontally,
    an oscillatable horizontable plate interposed vertically between said stations, said plate horizontally spanning the distance between said stations,
    means supporting said plate for arcuate movement between said stations,
    an injection mold movable arcuately with said plate and actuatable vertically relative to said plate for positioning at each of said stations,
    a blow mold movable arcuately with said plate,
    actuating means for said injection mold, and
    means for oscillating said plate.

5. In an apparatus for making a plastic container having an injection molded neck and a blow molded body,
    a vertically fixed, horizontally oscillatable plate;
    means for oscillating said plate to a plurality of arcuately adjusted positions;
    said plate having an aperture therethrough;
    an injection mold carried by said plate for oscillation therewith and vertically aligned with said aperture, said injection mold including a pendant core pin,
    means for vertically displacing said injection mold relative to said plate;
    a parison mold located beneath the plate in a fixed position and having an open topped cavity registering with said aperture at one adjusted position of said plate,
    blow mold sections mounted on said plate for oscillation therewith;
    said blow mold sections being horizontally actuatable relative to said plate to a closed position overlying said aperture and to an open position straddling said aperture, said blow mold sections when closed defining a blow mold cavity,
    and means for actuating said blow mold sections,
    said injection mold being displaceable downwardly through said aligned aperture to insert said core pin into said parison mold cavity and upwardly to a position above said plate at which said core pin is surrounded by said blow mold cavity.

6. In an apparatus for making a plastic container having an injection molded neck and a blow molded body,
    a machine frame including a transverse upper support element;
    a vertically fixed plate horizontally displaceable relative to said frame;
    means for arcuately displacing said plate to each of several arcuately adjusted positions;
    said plate having an aperture therethrough, an injection mold carried by said plate for displacement therewith and vertically aligned with said aperture;

a parison mold located beneath the plate in a fixed position vertically aligned with said frame upper support element and registering with said aperture as said plate is moved to one of its said adjusted positions, means for supplying plasticized material under pressure to said parison mold, a fluid actuated hydraulic cylinder displaceable with said plate for vertically displacing said injection mold relative to said plate (1) to depend through said aperture into engagement with the parison mold and (2) to overlie said plate in spaced relation thereto, said cylinder having its upper extremity normally spaced from said frame upper element to accommodate relative displacement of said plate, and means for actuating said cylinder, actuation of said cylinder to depend said mold through said aperture engaging said cylinder with said frame upper support element to retain said mold in engagement with said parison mold against the pressure exerted thereon by said material under pressure.

7. In an apparatus for making a plastic container;

a fixed frame having an upper support element and a lower support element;

a vertically fixed, horizontally oscillatable plate journalled in said frame for movement between said upper and lower elements;

means for oscillating said plate to each of several arcuately adjusted positions;

said plate having an aperture therethrough;

an injection mold carried by said plate for oscillation therewith and vertically aligned with said aperture;

a parison mold carried by said frame lower element, such parison mold being located beneath the plate in a fixed position and being vertically aligned with said aperture and said injection mold as said plate is moved to one of its adjusted positions;

means for supplying plasticized material under pressure to said parison mold;

a fluid pressure actuated cylinder assembly having an actuating rod secured to said injection mold and a cylinder carried by said plate for movement therewith; and fluid pressure means for actuating said assembly (1) to lower the injection mold into abutment with said parison mold, the reaction to the force exerted by said assembly during such abutment bottoming said cylinder on said upper support element and (2) to elevate the injection mold from abutment with said parison mold, the release of the force previously exerted by said assembly accommodating relative frame-plate movement since said cylinder is no longer bottomed on said upper frame element.

References Cited

UNITED STATES PATENTS

| | | | |
|---|---|---|---|
| 2,914,799 | 12/1959 | Canfield | 264—97 |
| 2,715,751 | 8/1955 | Weber | 264—97 XR |
| 3,002,225 | 10/1961 | Goller | 264—97 |
| 2,789,312 | 4/1957 | Borer | 18—5 |
| 2,853,736 | 9/1958 | Gussoni | 18—5 |
| 3,305,890 | 2/1967 | Senior et al. | 18—5 |

FOREIGN PATENTS 1,046,602 7/1953 France.

WILBUR L. McBAY, *Primary Examiner.*

ROBERT F. WHITE, *Examiner.*

R. B. MOFFITT, *Assistant Examiner.*

UNITED STATES PATENT OFFICE
CERTIFICATE OF CORRECTION

Patent No. 3,357,045                            December 12, 1967

Lawrence D. Ninneman

It is hereby certified that error appears in the above numbered patent requiring correction and that the said Letters Patent should read as corrected below.

Column 11, line 46, for "and", second occurrence, read -- said --.

Signed and sealed this 18th day of February 1969.

SEAL)
Attest:

Edward M. Fletcher, Jr.                         EDWARD J. BRENNER
Attesting Officer                                Commissioner of Patents